United States Patent [19]
Witten-Hannah et al.

[11] Patent Number: 6,000,232
[45] Date of Patent: Dec. 14, 1999

[54] REFRIGERATION SYSTEM AND METHOD OF CONTROL

[75] Inventors: Daniel Witten-Hannah; David Andrew Thomas; Nicholas David Hayes, all of Auckland, New Zealand

[73] Assignee: Fisher & Paykel Limited, Auckland, New Zealand

[21] Appl. No.: 09/024,836

[22] Filed: Feb. 17, 1998

[30] Foreign Application Priority Data

Feb. 18, 1997 [NZ] New Zealand .............................. 314264

[51] Int. Cl.⁶ ................................ F25D 17/06; F24F 3/00
[52] U.S. Cl. ................................ 62/89; 62/179; 165/208; 165/217
[58] Field of Search ........................... 236/49.3; 165/214, 165/217, 208; 62/179, 89

[56] References Cited

U.S. PATENT DOCUMENTS

| | | | |
|---|---|---|---|
| 4,481,787 | 11/1984 | Lynch | ........................................ 62/180 |
| 4,828,016 | 5/1989 | Bronn et al. | ........................... 236/46 R |
| 4,911,358 | 3/1990 | Mehta | .................................... 236/46 R |
| 5,344,069 | 9/1994 | Narikiyo | ............................. 165/217 X |

*Primary Examiner*—William Wayner
*Attorney, Agent, or Firm*—Trexler, Bushnell, Giangiorgi & Blackstone, Ltd.

[57] ABSTRACT

A refrigeration system is disclosed in which temperature regulation and energy efficiency are improved. Each compartment to be cooled is provided with a variable speed fan, the speed of which is controlled dependent on that compartment's temperature, the temperature required of that compartment, and the difference between required and actual temperatures for any other compartments. The temperatures are monitored continually and fan speeds altered so that the compartment furthest from its required temperature receives the most cooling (highest fan speed). An alternative embodiment is also disclosed wherein the speed of one compartment's fan is fixed and the other varied.

23 Claims, 11 Drawing Sheets

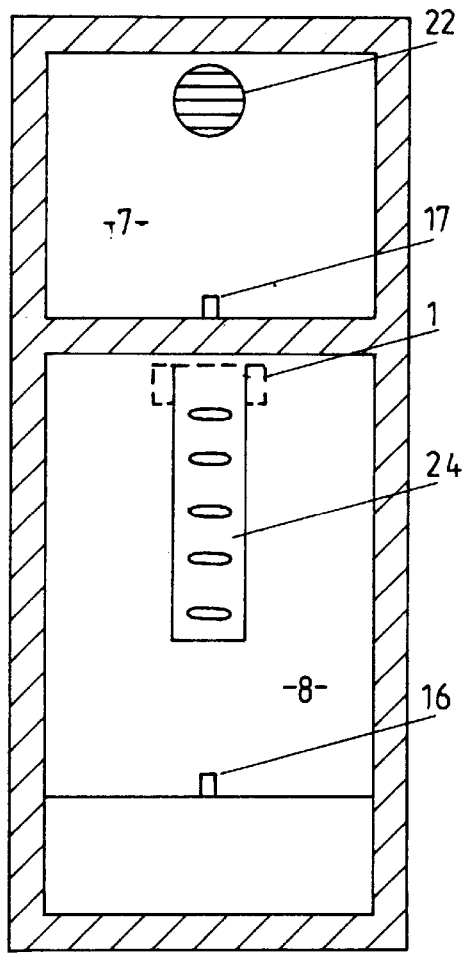
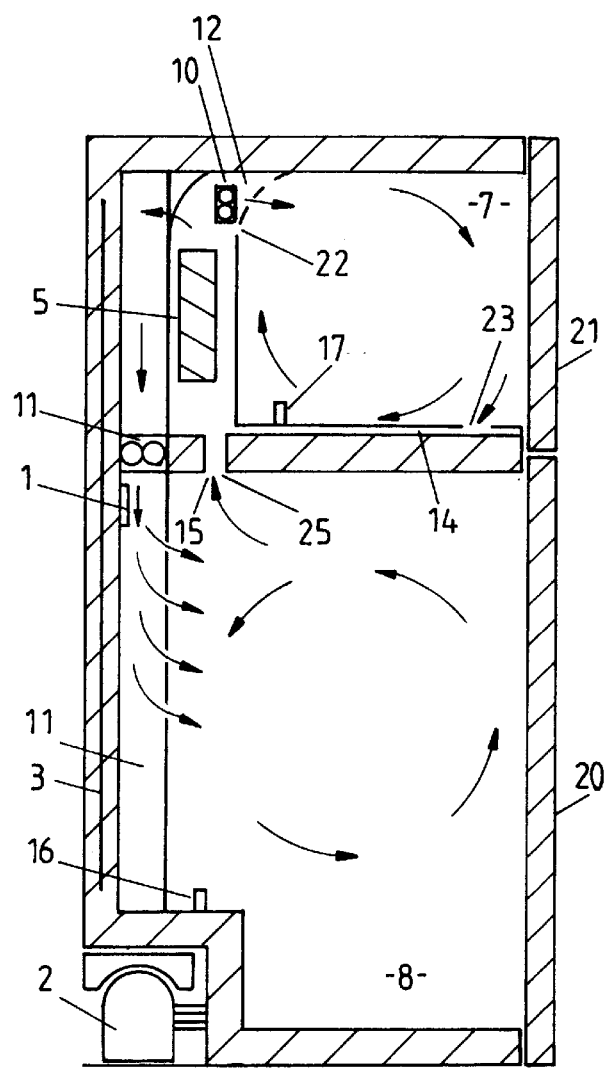
FIG. 1
FIG. 2

REFRIGERATION SYSTEM AND METHOD OF CONTROL

BACKGROUND OF THE INVENTION

1. Field of the Invention

This invention relates to refrigeration equipment and in particular, though not solely, to apparatus for controlling the cooling of refrigeration systems and control systems used therein.

2. Description of the Prior Art

Temperature control system used in some early refrigerators simply comprised a thermostat which ensured tat the compressor turned off when it required temperature was reached within the refrigerator. While this simple style of controller may have been sufficient in a single compartment refrigerator, it is not suitable in multiple compartment/multiple temperature zone cooling systems.

In a two compartment refrigerator/freezer, the temperatures of the two compartments are required to be maintained at selected but different temperatures. In order to accomplish this with a single evaporator, valves have been used to control the flow of cooling air to the various compartments from the evaporator so that each compartment receives sufficient cooling. An example of this type of system is disclosed in U.S. Pat. No. 4,481,787 assigned to Whirlpool Corporation. However, it is well known that this type of cooling system usually results in tie temperatures of the various compartments following each other or "tracking". An example of this behaviour is when a load of groceries are placed in the refrigerator or product compartment of a refrigerator/freezer. The compressor will be called upon to do more work on the refrigerant to lower the temperature of the evaporator so that cold air may be introduced to the product compartment to cool the new groceries. Accordingly, any air fed to the freezer compartment (either it is required because the temperature of the freezer compartment temporarily drops below its set temperature or due to "back pressure" from air flowing into the product compartment) will likely be at a temperature below the temperature required of the freezer compartment (which is already at its required temperature) and thus the freezer will be over cooled. The converse is also true when warm items are placed in the freezer compartment resulting in the product compartment being over cooled. In addition, prior multiple compartment cooling devices have not attempted to minimise energy consumption by ensuring that required compartment temperatures are reached at substantially the same time, allowing the compressor to only ever be used to cool both compartments at once and then to be turned off.

It is therefore an object of the present invention to provide a cooling device which will at least go some way towards overcoming the above disadvantages or which will at least provide the public with a useful choice.

Accordingly, in a first aspect, the invention consists in a cooling device comprising:

refrigeration plant means including condenser means, evaporator means and energisable compressor means, compartments to be maintained at selected temperatures, a first of said compartments to be maintained at a first selected temperature and a second of said compartments to be maintained at a second selected temperature, each of said compartments having an inlet and an outlet, an evaporator air flow passageway means which houses and is thereby cooled by said evaporator means, air flow regulating means for each said one compartment, a first air flow regulating means provided to regulate air flow in said first compartment and a second air flow regulating means to regulate air flow in said second compartment, said air flow regulating means regulating the amount of cooling supplied to each of said compartments, air flow supply passageways connecting the respective inlets of each of said compartments to said evaporator air flow passageway to allow air flow to said compartments, air flow return passageways connecting the respective outlets of each of said compartments to said evaporator air flow passageway to allow air to flow from said compartments, temperature sensing means in each of said compartments, control means which receives input from each said temperature sensing means and outputs control signals to each said air flow regulating means to regulate the air flow generated by each said air flow regulating means in accordance with programmed instructions so that the temperature in each of said compartments reach their respective selected temperatures at substantially the same time.

In a second aspect, the invention consists in a method of operating a cooling device having refrigeration plant means including condenser means, evaporator means and energisable compressor means, two compartments to be maintained at selected temperatures, a first of said compartments to be maintained at a first selected temperature and a second of said compartments to be maintained at a second selected temperature, each of said compartments having an inlet and an outlet, an evaporator air flow passageway means which houses and is thereby cooled by said evaporator means, air flow regulating means for each said compartment, a first air flow regulating means provided to regulate air flow in said first compartment and a second air flow regulating means to regulate air flow in said second compartment, said air flow regulating means regulating the amount of cooling supplied to each of said air flow supply passageways connecting the respective inlets of each of said compartments to said evaporator air flow passageway to allow air to flow to said compartments, air flow return passageways connecting the respective outlets of each of said compartments to said evaporator air flow passageway to allow air flow from said compartments, temperature sensing means in each of said compartments, and control means which receives input from each said temperature sensing means and outputs control signals to each said air flow regulating means to regulate the air flow generated by each said air flow regulating means in accordance with programmed instructions so that the temperature in each of said compartments reach their respective selected temperatures at substantially the same time, said programmed instructions comprising the steps of:

i) sensing the temperatures in each of said compartments, ii) calculating, for each said compartment, a difference temperature value between the sensed temperature in that compartment and that compartment's selected temperature, iii) determining the amount of regulation required by each said air flow regulating means in order that each of said compartments will substantially reach their selected temperatures at the same time, iv) operating each said air flow regulating means at the determined amount of regulation, v) repeating steps (i) to (v) until each compartment has reached its selected temperature, and vi) de-energising said energisable compressor means and reducing the amount of regulation of each said air flow regulating means to zero.

BRIEF DESCRIPTION OF THE DRAWINGS

The invention consists in the foregoing and also envisages constructions of which the following gives examples.

One preferred form of the invention will now be described; with reference to the accompanying drawings in which:

FIG. 1 is a front elevation of a cross-section through a refrigerator constructed in accordance with a first preferred embodiment of the present invention, FIG. 2 is a side elevation of a cross-section through the refrigerator of FIG. 1.

DETAILED DESCRIPTION OF THE PREFERRED EMBODIMENT

Figure 11:
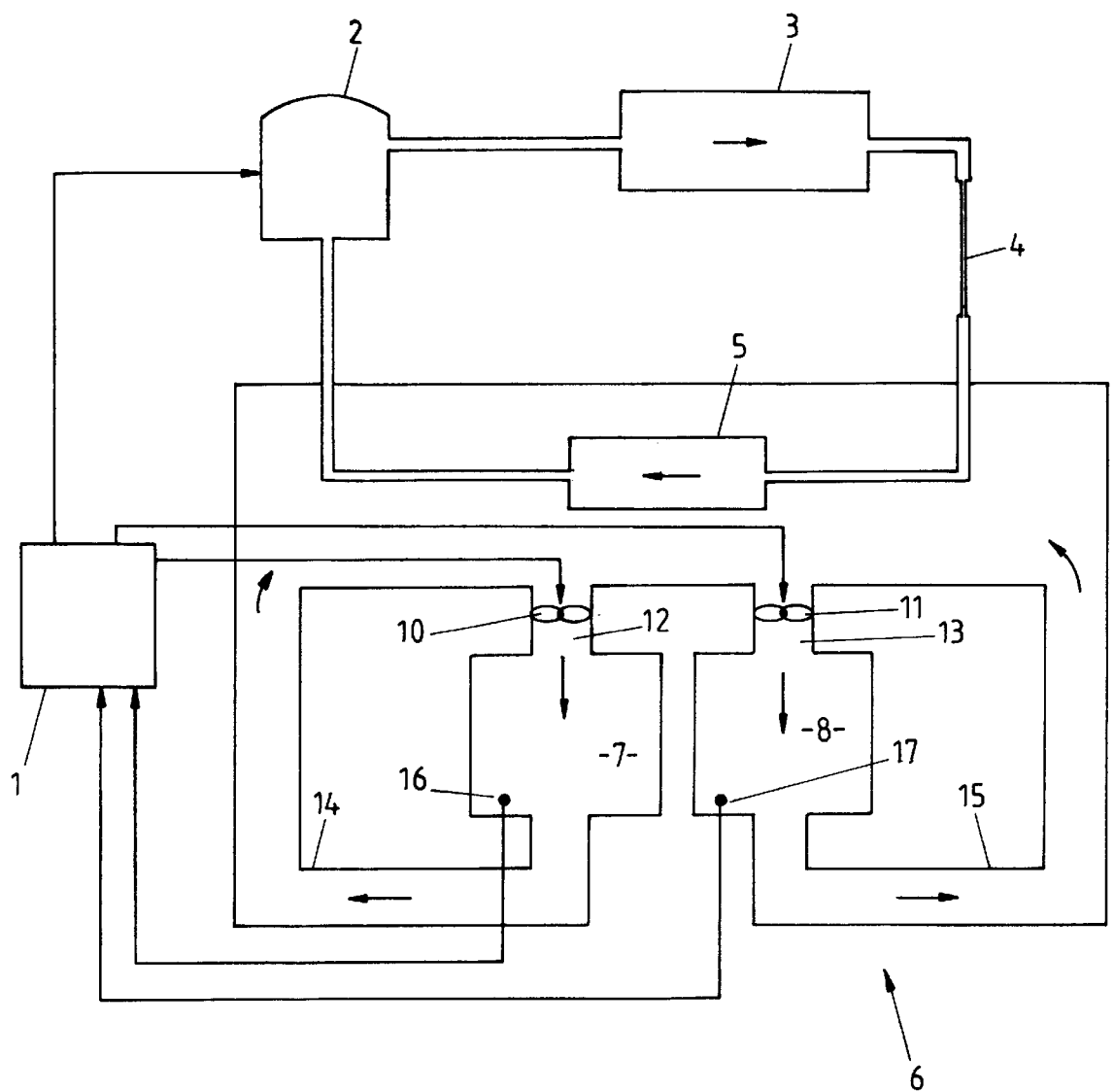
FIG. 11 is a schematic block diagram of the refrigeration system and controller of the refrigerators of FIGS. 1 and 3.

With reference to FIG. 11 of the drawings, a schematic block diagram representation of a refrigeration system according to a preferred form of the present invention is shown. The refrigeration system includes refrigeration plant means or refrigeration system comprising energisable compressor means air compressor 2, a condenser 3, capillary 4 and evaporator 5. The refrigeration system operates in the well known way of circulating compressible refrigerant which expands in evaporator 5 (extracting heat from the evaporator's surroundings), is compressed by compressor 2, condenses in condenser 3 (transferring heat out to the condenser's surroundings) and then returns to evaporator 5 by way of capillary 4. The refrigeration system also includes a combination refrigerator/freezer cabinet 6 which houses the above components and also contains a number of compartments, for example a freezer compartment 7 and a product or refrigerator compartment 8.

An evaporator air flow passageway 9 houses evaporator S and is thereby cooled by the operation of the refrigeration system described above. Air cooled by evaporator 5 is drawn into product compartment 8 and freezer compartment 7 by air flow regulating means, for example variable speed fans 10 (controlling air flow through the freezer compartment 7) and 11 (controlling air flow through the product compartment 8. At least one air flow regulating means is provided for each compartment of the refrigerator/freezer 6. Fan 10 is provided in an air flow passageway 12 connecting the evaporator air flow passageway 9 to the inlet of the freezer compartment while fan 11 is provided in an air flow passageway 13 connecting the evaporator air flow passageway 9 to the inlet of the product compartment. Air which has passed through product compartment 8 (having cooled the compartment and any products therein) passes through the outlet of the product compartment and returns to evaporator air flow passageway 9 for further cooling via air flow return passageway 14. Similarly, air which has passed through freezer compartment 7 (having cooled the compartment and any products therein) passes through the outlet of the freezer compartment and returns to evaporator air flow passageway 9 for firer cooling via air flow return passageway 15.

From the above description it should be appreciated that the temperature of the various compartments of the refrigerator/freezer 6 may be controlled by adjusting the amount of air (cooled by evaporator 5 in evaporator air flow passageway 9) which is passed through each compartment. Accordingly, by controlling the speed of the variable speed fans 10 and 11, the temperature of the compartments can be controlled as an increase in fan speed relates to an increase in the volume flow rate of cooling air entering a compartment. It should be noted that the freezer compartment is normally provided closer to the evaporator so that air travelling to the product compartment will normally arrive at a higher temperature than that entering the freezer compartment.

A further component of the refrigeration system is control means, for example electronic controller 1 which preferably comprises a microprocessor and associated memory which may store executable software code. Controller 1 receives inputs from, for example temperature sensors 16 and 17 which are positioned within the freezer and product compartments respectively and provides output control signals to devices, for example, fans 10 and 11 to increase or decrease their speeds. Controller 1 may thereby be programmed to control, for example, the temperatures of the various compartments of the refrigerator/freezer in accordance with a series of programmed instructions.

Figure 3:
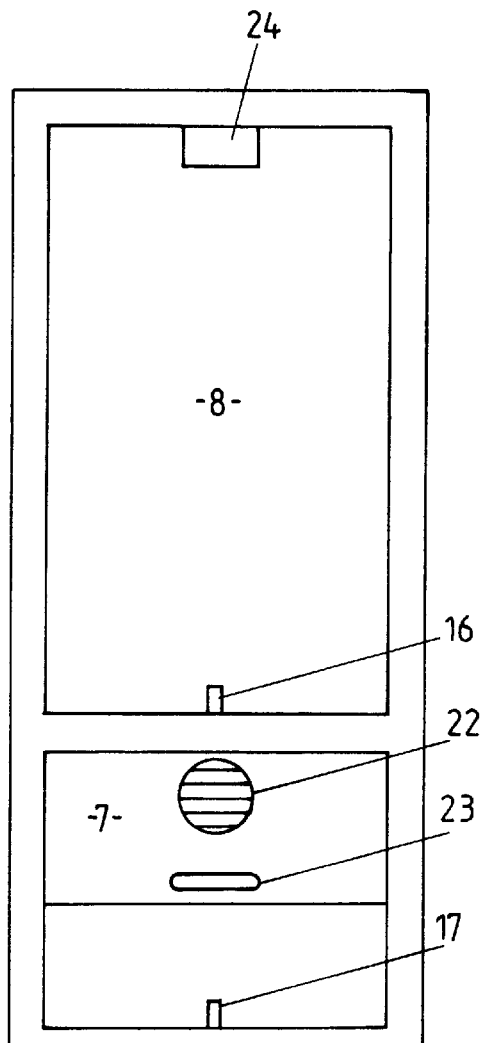
FIG. 3 is a front elevation of a cross-section through a refrigerator constructed accordance with a second preferred embodiment of the present invention.
Figure 4:
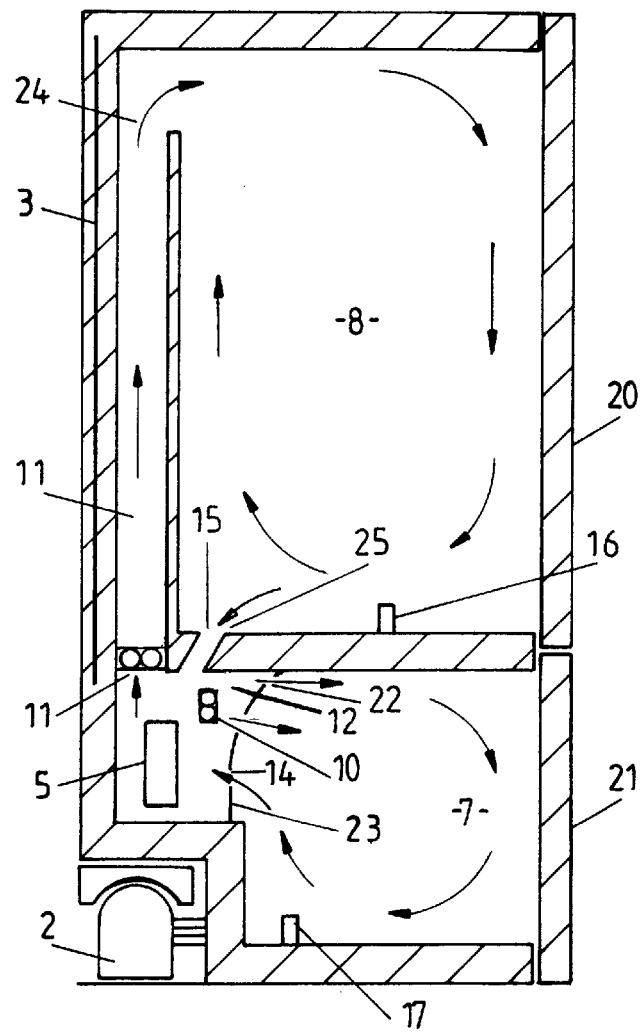
FIG. 4 is a side elevation of a cross-section through the refrigerator of FIG. 3.

With reference to FIGS. 1 and 2 of the drawings, cross-sectional front and side elevations of a first preferred practical embodiment of a refrigerator/freezer according to the present invention are shown. The embodiment of FIGS. 1 and 2 is of a freezer compartment atop the product compartment. With reference to FIGS. 3 and 4 of the drawings, a second preferred embodiment of a refrigerator/freezer according to the present invention is shown in which the freezer compartment is beneath the product compartment. It can be seen in FIGS. 1 to 4 that the compartments each include doors (product compartment door 20 and freezer compartment door 21) to allow access by a user. Controller 1 may also be provided with inputs from sensors (not shown) which detect the state of each door (either opened or close). In addition, it can be seen that the evaporator is preferably positioned at the rear of the freezer compartment and that air enters the freezer compartment through a grill 22 and exits through a duct 23. Similarly, air enters the product compartment through a grill 24 and exits through a duct 25.

Control System Detail

With reference to the flow charts of FIGS. 7 to 10, in use, controller 1 is programmed to cause fans 10 and 11 to operate at their highest practicable speeds to cause sufficient air flow through the refrigerator/freezer to achieve good heat exchange at evaporator 5, However, as fans operating at high speeds usually produce unacceptable noise levels the controller according to the present invention (as will soon be described) is able to limit the maximum fan speeds if the heat loading on the refrigerator/freezer as a whole is low (that is, if the refrigeration plant is not working too hard). Also, in order to minimise the amount of energy used by the refrigeration plant and the fans, the controller attempts to adjust the fan speeds to match the respective compartments' requirement for cooling and to then turn off the fans and the refrigeration plant at substantially the same time once the compartments reach their desired temperatures.

Figure 5:
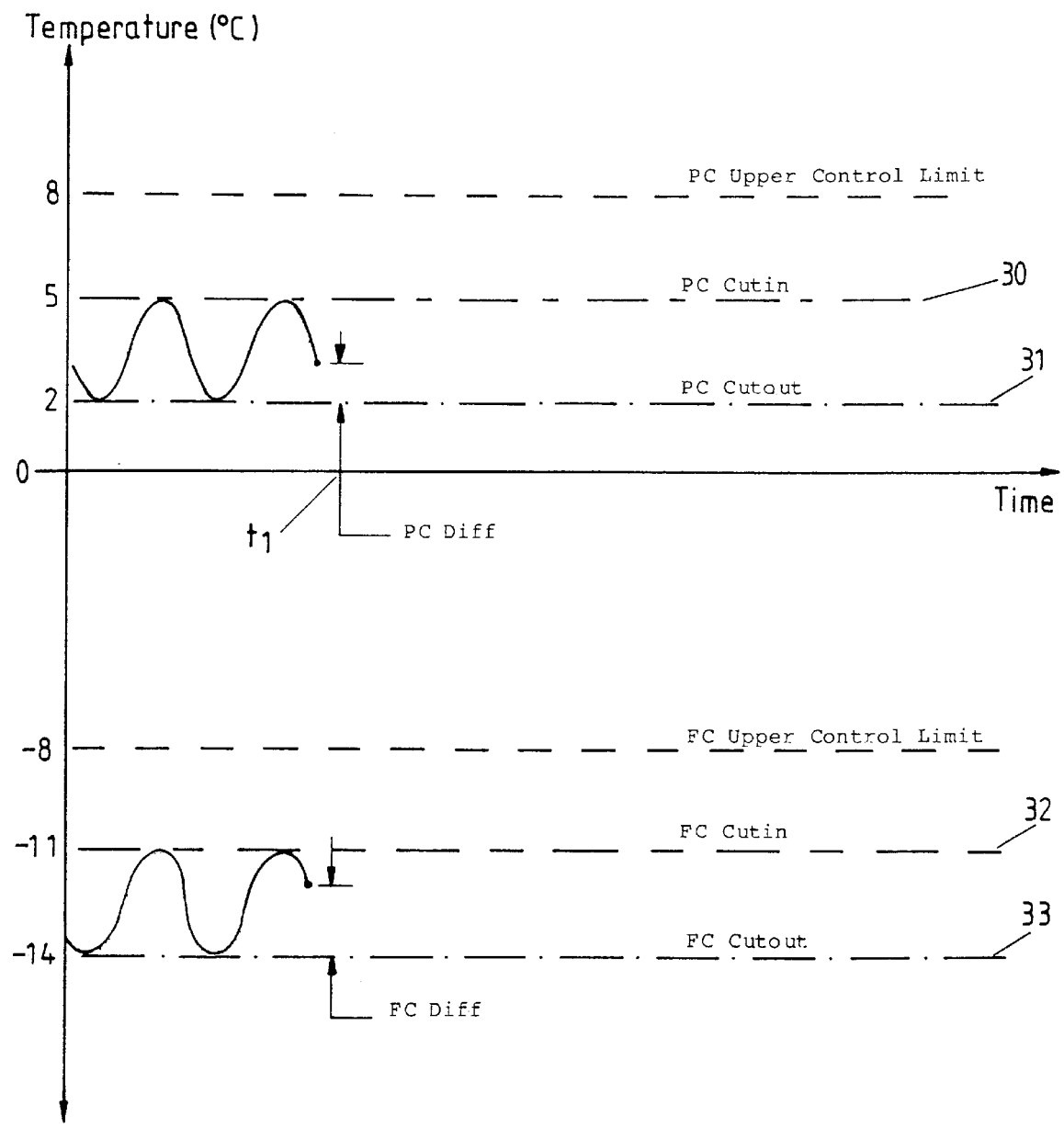
FIG. 5 is a graph of temperature versus time showing the normal operating temperatures in both product and freezer compartments of a refrigerator according to the present invention.

With reference to FIG. 5, a graph of temperature versus time is shown where the temperature of the product compartment (top) is plotted along with the temperature of the freezer compartment. FIG. 5 displays a "steady state" sinusoidal type temperature oscillation in both compartments which is typical of conditions where the compartment doors remain closed (for example in the middle of the night). It can be seen from the graph that the temperature of the product compartment oscillates between its "Cutin" temperature 30 (a selected temperature or a required temperature at which cooling is turned on for the product compartment) and its "Cutout" temperature 31 (the temperature at which cooling is turned off far the product compartment) temperatures of, for example 2° C. and 5° C. while the freezer compartment temperature oscillates between its cutin 32 and cutout 33 temperatures of −11° C. and −14° C. It should be noted that the respective cutin temperatures could be set to equal their respective cutout temperatures in which case, in theory, a required temperature of each compartment could be maintained indefinitely without oscillation. However, in reality it is impractical not to allow a moderate amount of moderation in each compartment's temperature.

Figure 7:
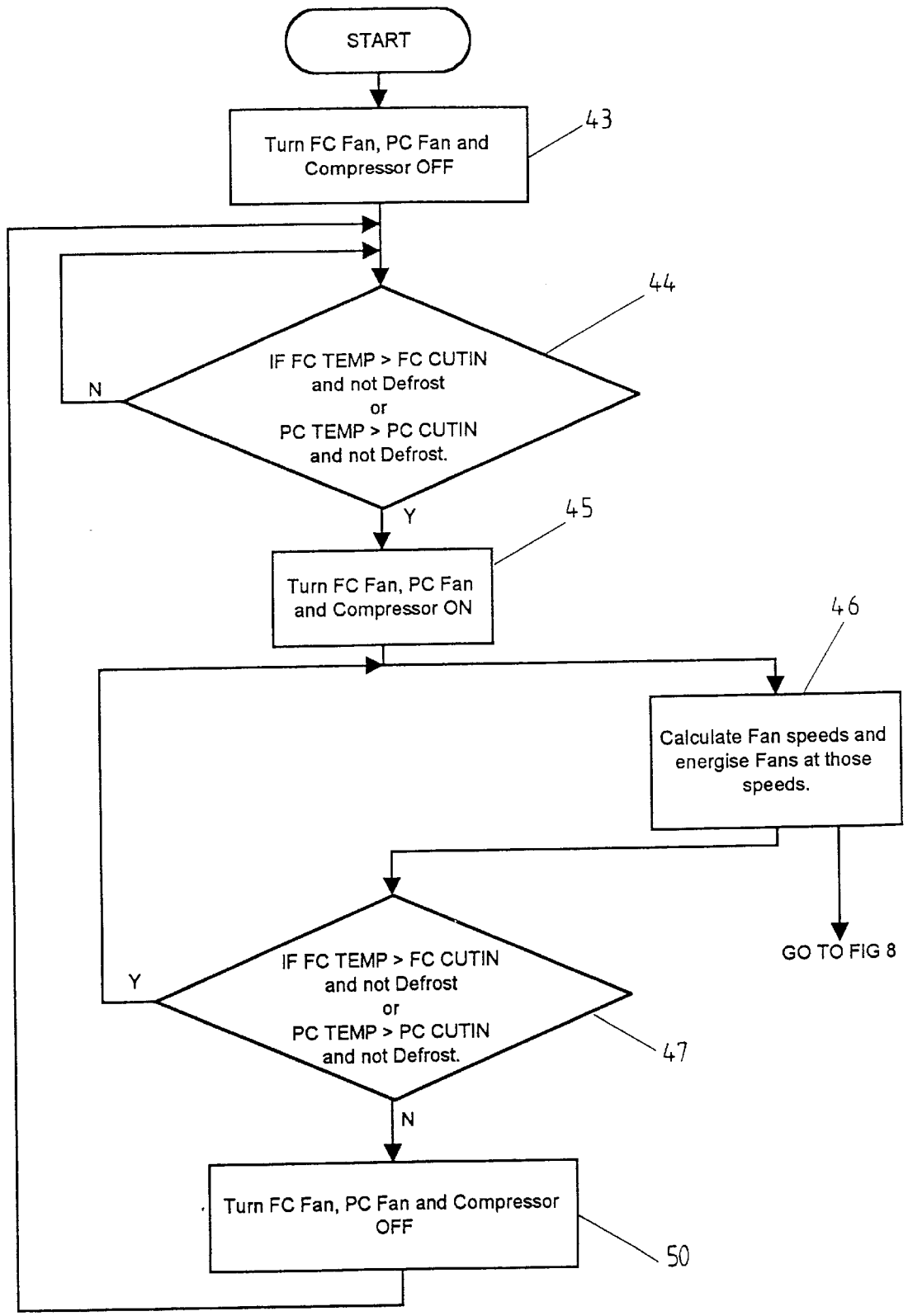
FIG. 7 is a flow chart of the main control loop of the control system according to the present invention incorporated into the refrigerators shown in FIGS. 1 and 3.
Figure 8:
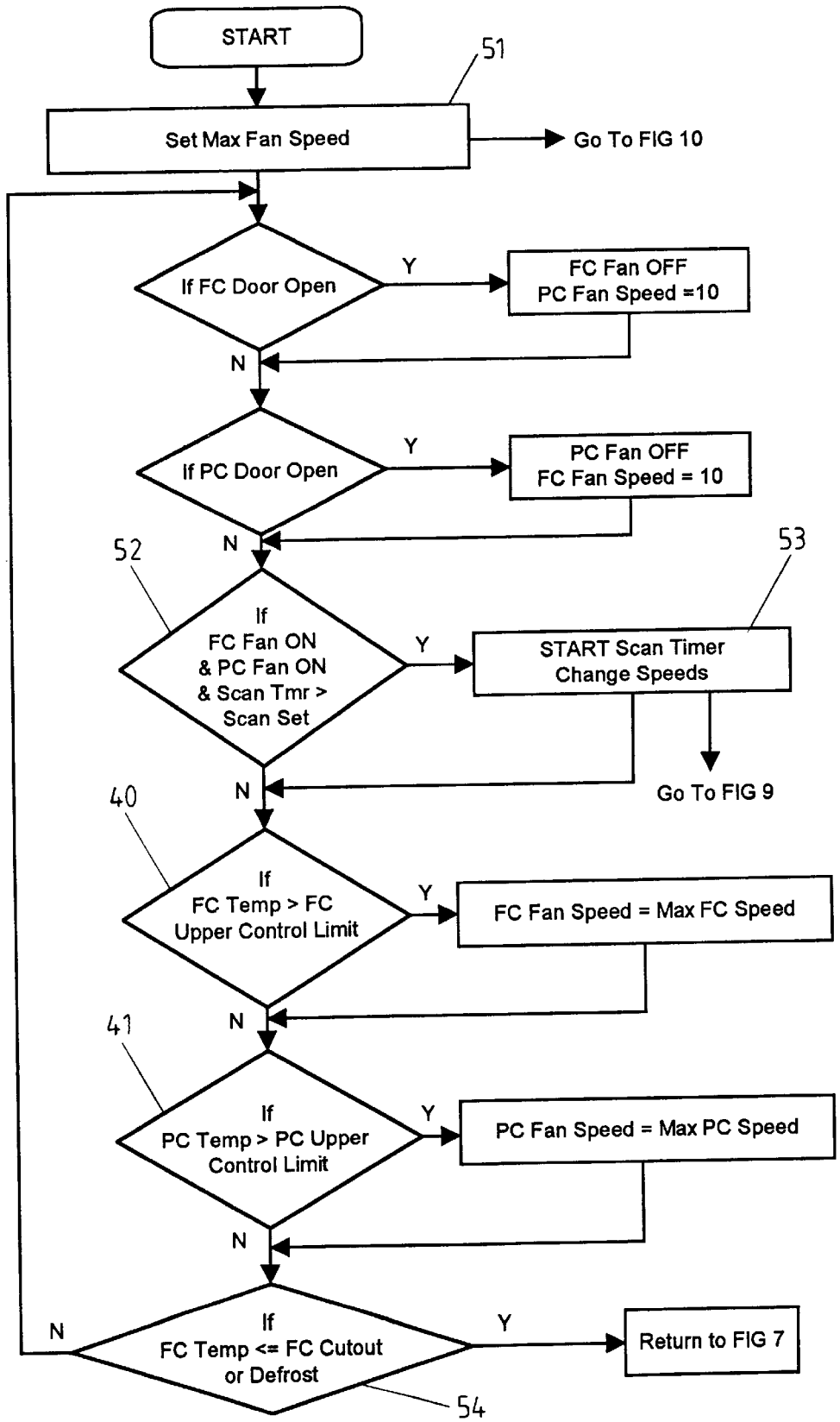
FIG. 8 is a flow diagram of the Set Fan Speed routine of the flow chart of FIG. 7.
Figure 9:
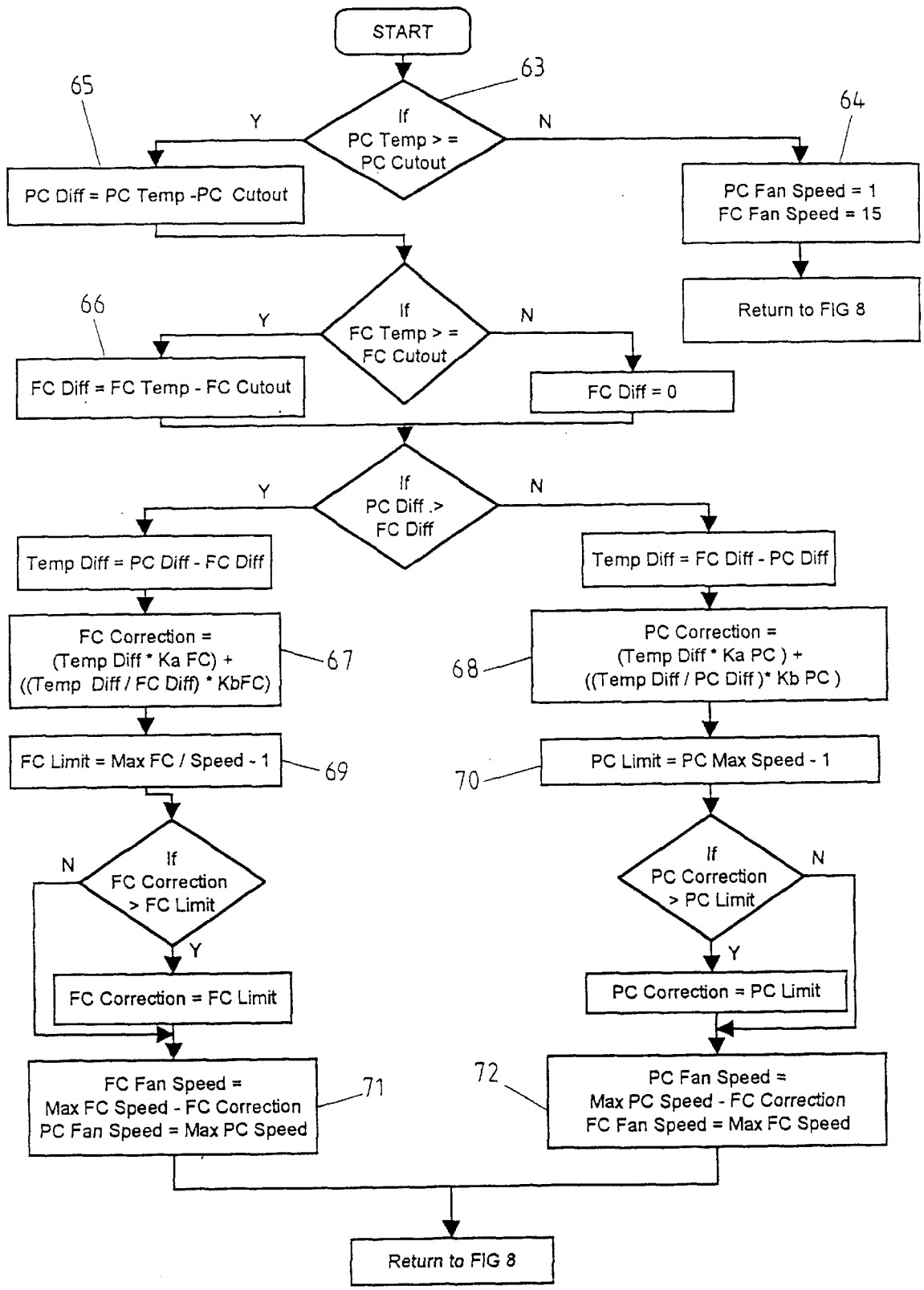
FIG. 9 is a flow chart of the Change Fan Speed routine of the flow chart of FIG. 8.
Figure 10:
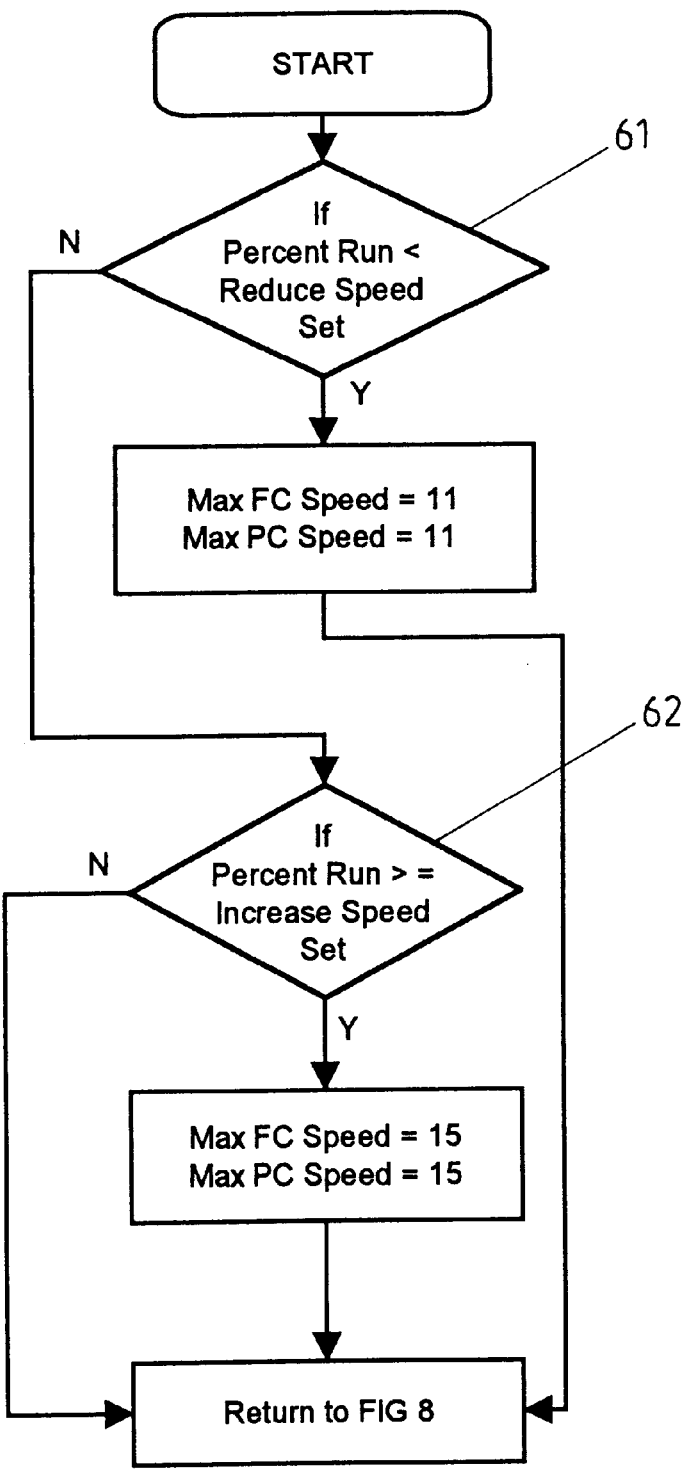
FIG. 10 is a flow chart of the Set Max Fan Speed routine of the flow chart of FIG. 8.

The main control algorithm representing the operation of the refrigeration control system incorporated into refrigerator/freezers according to the present invention is shown in FIG. 7. FIGS. 8, 9 and 10 are "sub-routines" of the flow chart of FIG. 7. At start up of the refrigerator/freezer (block 43), the controller first de-energises the compartment fans and the compressor. A decision is then made to determine if the temperatures in the freezer or product compartments have risen above their cutin temperatures in block 44. If neither of the temperatures have exceeded the respective cutin temperatures then no change is made to the state of the fans or compressor. However, if the freezer compartment temperature or product compartment temperatures have exceeded their cutin temperatures then the compressor and the fans are turned on in block 45. It should be noted that the, compressor could be any type of compressor including a simple on/off type or a variable output type such as a linear compressor.

The speed at which the fans are to driven at is then determined in FIG. 8 via block 46 (FIG. 8 will be explained below). A further decision is then made in block 47 to determine if the product compartment's temperature has exceeded its cutin temperature. If either compartment has exceeded its cutin temperature then control once again passes to FIG. 8 via block 46 and new fan speeds are calculated and implemented. Once the temperatures of both compartments are back within their respective cutin temperatures again, control passes on to block 50 wherein each of the compartment fans and the compressor are turned off until either compartment again reaches a temperature above its cutin in block 44.

It will also be seen that blocks 44 and 47 also include the proviso that the decisions will only be true if DEFROST is not occurring. DEFROST is a variable which is either true (if the periodic defrosting of the evaporator is, presently occurring) or false is defrosting is not presently occurring. The occasional defrosting of the refrigerator/freezer is carried out under the instructions of controller 1 either at preset intervals of time or in response to a calculation taking into account various factors such as, for example, the number of door openings, the PERCENT RUN TIME variable and temperature histories in the compartments. It should be appreciated that defrosting involves raising the temperature of the evaporator in order to remove built up ice and that this increase in temperature will inevitably effect the temperature of the compartments and so temperature readings during defrosting are effectively ignored.

With reference now to FIG. 8 in which the respective fan speeds are calculated, first, the maximum fan speed is calculated in FIG. 10 via block 51. In block 61 of FIG. 10 a variable named PERCENTAGE RUN is compared to another variable called REDUCE SPEED SET. The PERCENTAGE RUN is basically equivalent to the duty cycle of compressor 2, that is $time_{on}/(time_{on}+time_{off})$. Accordingly, controller 1 must constantly or periodically update the PERCENT RUN variable by recalculating this equation. If the PERCENT RUN variable drops below the preset REDUCE SPEED SET variable then this is an indication that the compressor has not had to work too hard and that the fans need not operate at their uppermost speed limit. Accordingly, the maximum speeds at which the fans will be operated is then set to, for example, 11 (which corresponds to about $^{11}\!/\!_{15}$ths of the fans rated speed). If, however, the PERCENT RUN variable exceeds a further preset variable called INCREASE SPEED SET in block 62 then this is an indication that the compressor is being over-worked and that an increase in maximum fan speed may assist in cooling the compartments sooner thus allowing the compressor to be turned off sooner.

Returning now to FIG. 8, if either refrigerator door 20 or freezer door 21 are open, then the associated fan is turned off while the other fan is set to a speed setting of 10 (corresponding to about $^{10}\!/\!_{15}$ths of the fans rated speed) so that cool air is not expelled out of the open door. In block 52, a decision is made so that if both fans are on (greater than zero speed) and a variable called SCAN TIMER is greater than a variable called SCAN SET, then fan speeds are recalculated in FIG. 9 via block 53 (FIG. 9 will be described below). The variable SCAN TIMER is a constantly increasing timer and allows for a fixed period of time (equal to SCAN SET) to elapse between each re-calculation of new fan speeds. The variable SCAN SET may be for example about 30 seconds. Once the recalculated fan speeds have been determined and set in place, a check is made in blocks 40 and 41 to ensure that the temperatures of either compartment are not over the upper control limits, in which case, irrespective of the previously calculated fan speeds, the fans are set to their maximum speeds. At block 54 a decision is made to return to FIG. 7 (to block 47) if the freezer compartment temperature is less than or equal to the FC Cutin temperature or if a defrost cycle is being carried out.

In FIG. 9, the actual calculations for fan speed are displayed. At block 63, if the product compartment's temperature is greater than the PC cutout value, then in block 64 the freezer compartment's fan is set to a speed of 15 (corresponding to about rated fan speed) while the product compartment's fan is set to 1 (corresponding to about 1/15th of the fan's rated speed) and control returns to FIG. 8 (to block 40).

If the product compartment temperature is however greater than or equal to the PC Cutout value then a calculation is made in block 65 to determine the value of a variable called PC DIFF. Similarly, in block 66 a variable called FC DIFF is calculated if the freezer compartment temperature is greater than or equal to the FC Cutout temperature. At any point in time, for example time $t_1$ the variable PC DIFF may be calculated as the difference between the present product compartment temperature (PC TEMP) and the PC Cutout temperature. Similarly the variable FC DIFF may be calculated for the freezer compartment, accordingly:

PC DIFF=PC TEMP−PC Cutout

FC DIFF=FC TEMP−FC Cutout

While the temperature of a compartment is above its Upper Control Limit temperature (for example 8° C. for the product compartment and −8° C. for the freezer compartment), the fan associated with that compartment is set to its maximum speed (see blocks 40 and 41 in FIG. 8). When a compartment temperature drops below its Upper Control Limit temperature, the control system according to the present invention determines which compartment (the "first compartment") is furthest away from its Cutout temperature setting and causes the fan associated with that compartment to rotate at its maximum speed. The fan associated with the (or all) "other" compartments) is then caused to rotate at a speed equal to the maximum fan speed less a "correction" amount. The correction amount is determined by the controller based on how much closer this "other" compartment is to its cutout temperature than the "first" compartment. Accordingly, as the fan associated with the "first" compartment is rotating at a greater speed, it can potentially reach its cutout temperature setting sooner than the "other" compartment. Hence, at some point in time the temperature of the "first" compartment will be closer to its cutout temperature than the "other" compartment is to its cutout temperature. At this point in time, the controller will arrange for the fan associated with the "other" compartment to operate at its maximum speed while the fan associated with the "first" compartment will be operated at a speed determined by subtracting a correction value from the maximum speed. Essentially the fan speeds are set in proportion to the amount of cooling required in each compartment.

The aforementioned correction value is preferably calculated by summing together two terms in blocks 67 or 68 (depending on which compartment is furthest from its cutout temperature). The first term is a function of the difference between the amount of cooling required for each compartment to reach their respective cutout temperatures. This "difference between the amount of cooling required" is called TEMP DIFF in the flow charts and is calculated by finding the difference between PC DIFF and FC DIFF. The greater the value of TEMP DIFF then the greater is the amount of speed reduction or correction on the fan associated with the compartment which is closest to its cutout temperature.

The second term in the correction calculation is a function of the ratio of the difference between the amount of cooling required in each compartment (TEMP DIFF) to the amount of cooling to be done in the compartment which is closest to its cutout temperature. The second term increases the sensitivity of the correction value when the temperature is nearing the actual cutout temperatures in an effort to improve the synchronisation of switching the fans off. Both terms are multiplied by proportionality constants (KaFC and KbFC for the freezer compartment and KaPC and KbPC for the product compartment) to give a weighting to the two effects working together.

Such that no one fan switches off completely while the other fan is still running, a lower fan speed limit is set by the calculation in blocks 69 and 70 which ensures that the maximum correction value allowable is one less than the maximum fan speed for that compartment. This means that the fan which is caused to rotate at a lower speed will have a minimum speed of 1. Finally, in blocks 71 and 72, the product compartment and freezer compartment fan speeds are set at maximum and maximum less correction as required. It is important that no one fan operates while the other is stopped as this would result in reverse air flow from on compartment to another, possibly drastically altering the compartment temperatures. Effectively, the minimum rotational fan speed allows the fan to act as a valve to stop air passing the fan.

Illustrative Example

Figure 6:
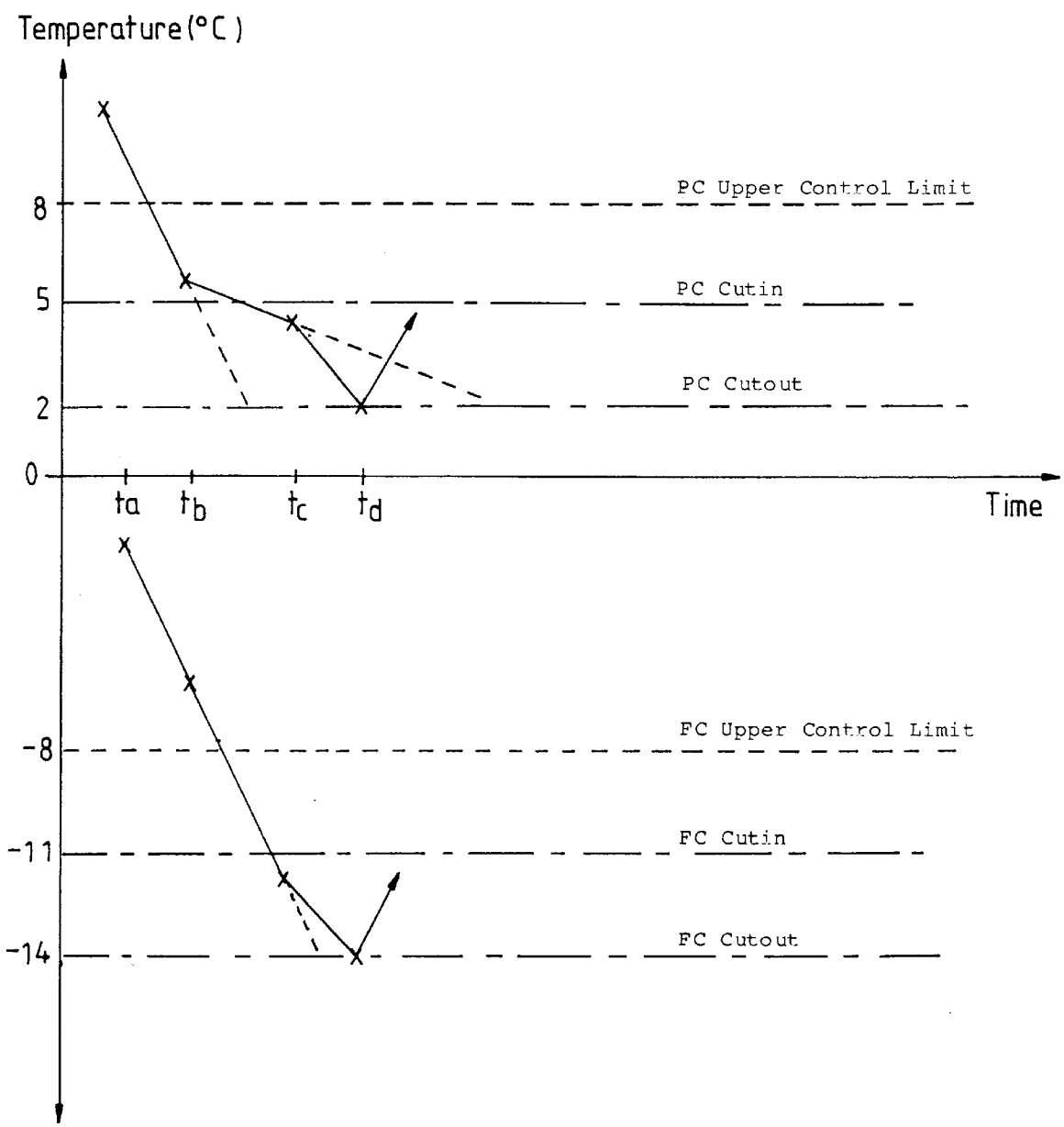
FIG. 6 is a graph of temperature versus time showing temperatures in both product and freezer compartments of a refrigerator according to the present invention from start-up when the compartment temperatures are outside their operating limits.

With reference now to FIG. 6, a practical example of the operation of the control system according to the present invention will be demonstrated.

Time=$t_a$

Both the product compartment and the freezer compartment are above their respective upper control limit temperatures and accordingly both fans will be set to their maximum speeds, The monitoring and calculation of fan speed correction will continue however the result is over-ridden by this warm condition.

Time→$t_b$

The product compartment temperature has now fallen below the PC upper control temperature. The product compartment is now closer to its cutout temperature than the freezer compartment is to its cutout temperature. Note also that the dashed linear extrapolation of the compartment temperatures indicate that the product compartment will reach its cutout temperature sooner than the freezer compartment will reach its cutout temperature. According, the product compartment fan's speed is slowed down at this point in proportion to its relative proximity to cutout, hence the product compartment's rate of cooling decreases from this point. Meanwhile, the freezer compartment fan continues to run at maximum speed because:

1) the freezer compartment temperature is still above the FC upper control limit, and
2) the freezer compartment temperature is further away from the FC Cutout temperature than the product compartment is from the PC Cutout temperature.

Time=$t_c$

The fast cooling rate in the freezer compartment combined with the slower cooling rate in the product compartment has allowed the freezer compartment temperature to now become closer to its cutout temperature than the product compartment temperature is to its cutout. Again, the dashed linear extrapolated temperatures indicate that the freezer compartment will now reach its cutout temperature sooner than the product compartment. In order to achieve synchronised arrival at the respective cutout temperatures, the fan control switches the product compartment fan to its maximum speed while and reduces the freezer compartment fan's speed according to the relative proximity of the freezer compartment temperature to cutout and the product compartment temperature to cutout as previously described. Time=$t_d$ Both compartments reach their respective cutout temperatures at the same point in time, thus avoiding reverse airflow from one compartment to the other which would occur if only one fan was operating. The compressor switches off at this point also. The compartments are allowed to warm up at their natural rates and when either one of them warms past their respective cutin temperatures the cycle begins afresh.

Alternative Preferred Embodiment

Figure 12:
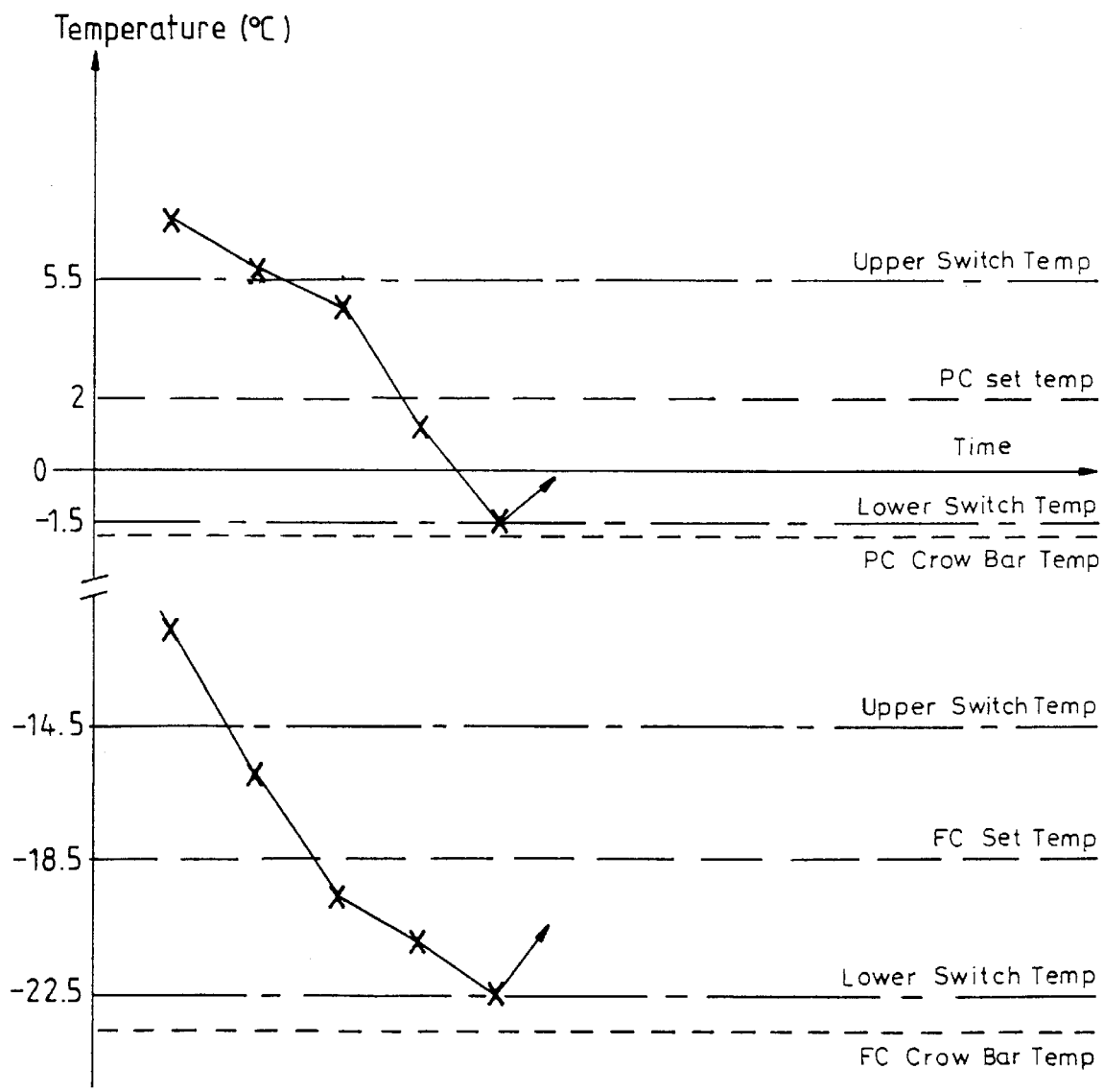
FIG. 12 is a graph of temperature versus time for the product and freezer compartments of a refrigerator/freezer controlled in accordance width the second preferred embodiment of the present invention.
Figure 13:
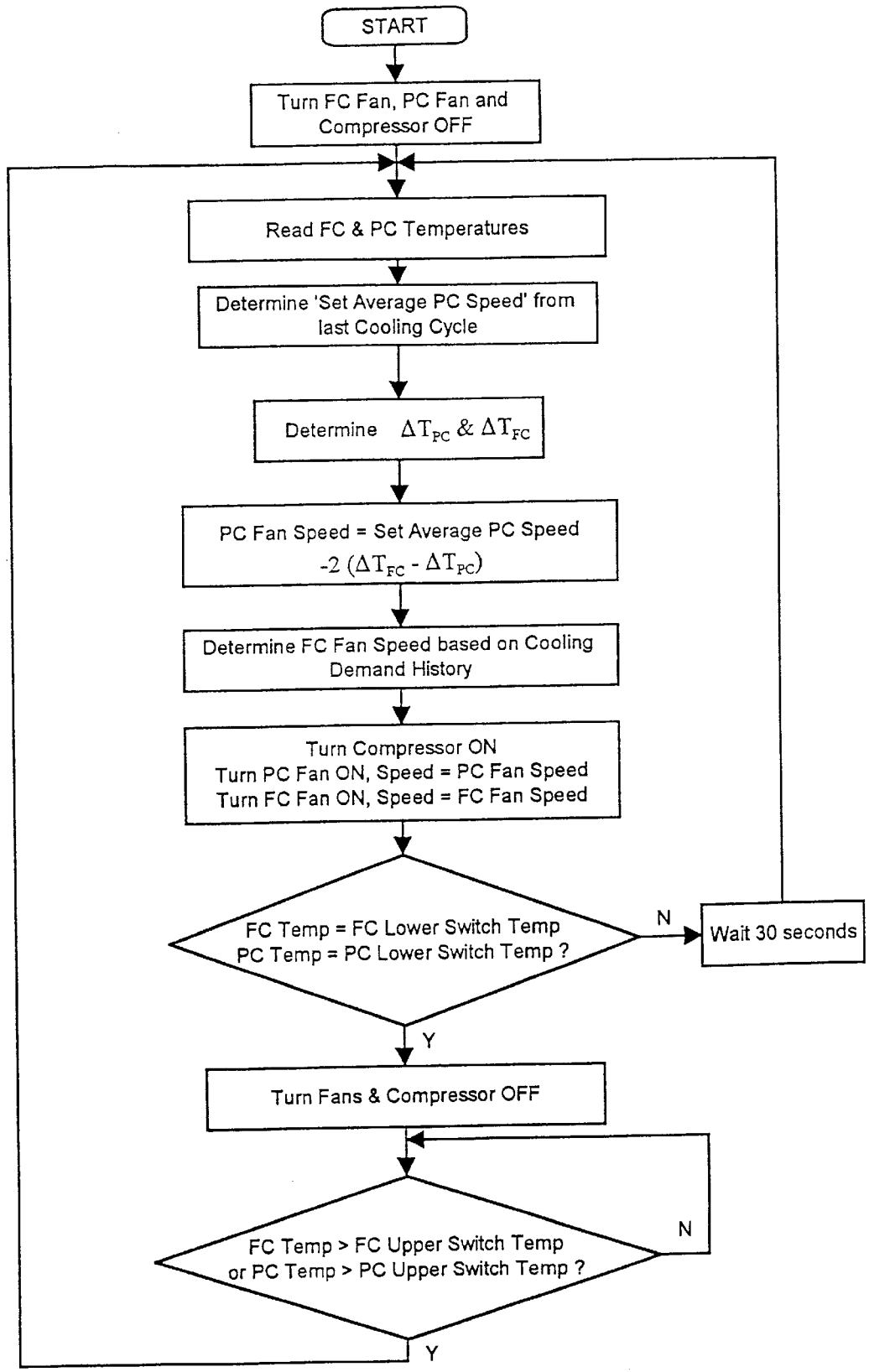
FIG. 13 is a flow diagram illustrating the control system according to the alternative preferred embodiment of the present invention.

With reference to FIGS. 12 and 13 an alternative preferred embodiment of the present invention will now be described. In the alternative preferred embodiment, the construction of the refrigerator/freezer is the same as that previously described however the controller is modified.

In the alternative preferred embodiment the controller is programmed to fix one of the compartment fans at a set speed while the other fan speed is controlled so that both compartment's temperatures reach their required set temperatures at substantially the same time. At this point (as in the previous embodiment) both fans are turned off along with the compressor. Preferably the freezer compartment fin 10 is fixed while the speed of the product compartment fin 11 is adjusted according to the requirement of that compartment relative to the freezer compartment and preferably the speed of the freezer compartment fan 10 is set to maximum. The fan control algorithm according to this alternative preferred embodiment is set out in summarised flow chart form in FIG. 13 and attempts to minimise fan speed changes which may be perceived as undesirable noise by the homeowner.

Fan Control Algorithm of the Alternative Preferred Embodiment

In the alternative preferred embodiment, a user input is supplied to the controller 1 so that the controller may select the set temperatures of each compartment. The following table details the preferred set temperatures required of both of the compartments for each user setting.

| User setting | FC Set Temperature | PC Set Temperature |
| --- | --- | --- |
| 1 | −20.0° C. | 0.0° C. |
| 2 | −18.5° C. | 2.0° C. |
| 3 | −17.0° C. | 4.0° C. |
| 4 | −15.5° C. | 6.0° C. |
| 5 | −14.0° C. | 8.0° C. |
| 6 | −12.5° C. | 10.0° C. |

A user setting of "2" may, for example be achieved by the user turning a dial to a setting of "2" or alternatively could be embodied by having a user press a push button until a display unit energises two Light Emitting Diode (out of a possible 6 LEDs).

Referring now to FIG. 12, an example graph of temperature versus time is shown with a user setting of "2" (accordingly, the italicised row in the above table is relevant). Drawn in on FIG. 12 are the FC and PC set temperatures of −18.5° C. and 2° C. respectively as well as upper and lower switch points for both compartments which control the energising/de-energising respectively of the refrigeration system's compressor and fans. The switch points for the product compartment are ±3.5° C. around the PC set temperature while the freezer compartment switch points are ±4.0° C. around the FC set temperature. In addition, each compartment has a "Crow Bar" temperature of PC set temperature −4.0° C. for the product compartment and FC set temperature −5.0° C. for the freezer comnpartrnent. The "Crow Bar" temperature is a switch point which, if reached within either compartment will cause the compressor and both fans to be turned off. The fan control system aims to cause both compartments to reach their lower switch point temperatures at substantially the same time so that the compressor may be de-energised along with both fans.

The temperatures of the compartments should normally oscillate between the upper and lower switch points, however, if one compartment's door is opened a number of times (or left open for a length of time), that compartment's temperature will rise while the other compartment's temperature will substantially remain the same. As the compressor is energised to try to draw heat from the warming compartment the temperature in the compartment which remained closed will also be drawn down and eventually its temperature will be below the lower switch point without the other compartment having reached its lower switch point. Accordingly,, as both compartments have not reached their lower switch points at the same time, the fans and compressor will remain energised. In order to eventually put a halt to this situation, once the temperature in the compartment which remained closed reaches its "Crow Bar" temperature, both fans and the compressor are de-energised and the thermal inertia of the refrigeration system relied upon to bring back a balance between the two compartments in their desired temperature ranges so that upon re-energisation of fans and compressors, both compartments should be back within their desired temperature ranges.

The controller 1 is programmed to set the speed of the freezer compartment fan 10 to maximum and to minimise fan speed changes, the speed of the product compartment fan 11 is set at the average speed used for the previous cooling cycle. A "cooling cycle" as used herein relates to the period of time between energising the compressor 2 and de-energising the compressor 2. When a cooling cycle continues for more than 15 minutes, the speed of the product compartment fan 11 will be updated each 15 minutes with the previous 15 minutes average fan speed. If a compartment door opens, the product compartment fan speed will not continue at the set average but will be adjusted according to the following equation each 30 seconds while the compartment doors remain closed:

set PC fan speed=set average PC speed−k×($\Delta T_{FC}$−$\Delta T_{PC}$)

where $\Delta T_{FC}$ is the difference between the actual freezer compartment temperature and the freezer compartment lower switch point and k is a constant. It has been found that a value of 2 for the constant k gives a good result.

As an example, at a user setting of "2" the following settings and temperatures will be used:

Lower switch point for FC=−22.5° C.

Actual FC temperature=−14.0° C.

Lower switch point for PC=−1.5° C.

Actual PC temperature=4.0° C.

Set average PC fan speed=8

Accordingly, set PC fan speed=8−2×((−14−(−22.5))−(4−(−1.5)))

set PC fan speed=8−2×(8.5−5.5)

set PC fan speed=8−2×3 set PC fan speed=2

It can be seen that, as the product compartment temperatwue 8 is closest to its lower switch point than the freezer compartment 7 is to its lower switch point ($\Delta T_{PC}$=55° C. compared to $\Delta T_{FC}$=8.5° C.), then the PC fan speed is reduced to allow the freezer compartment to "catch up" to the product compartment in terms of cooling.

The minimum allowed product compartment fan speed is for example 2 and the maximum for example 13. The default maximum for the freezer compartment fan speed is 17 but in a low demand situation this will drop to 14. A low demand situation could for example be defined by a percentage run time value (as previously described) of less than, for example, 40%. The maximum freezer compartment fan speed would then return to 17 when the percent run time value increased again to, for example, 45%. The fan speeds referred to above range in value from 2 to 17 and are values on a linear scale which are "seen" as a voltage level by the fan motor. This voltage is supplied by the controller as a pulse width modulated (PWM) waveform of 0.83 ms pulse unit time period and a complete period of 14 ms (0.83 ms×17).

A number of practical additions to the above system include the switching on of the compressor occurring when either compartment temperature warms to its upper switch point and the compressor has been off for a minimum of, for example, 5 minutes. This will reduce the unnecessary energisation of the compressor due to spurious temperature readings. Whenever the compressor is turned on, the fans will also be switched on except immediately following defrost cycles when there is a delay of, for example, 30 seconds after the compressor has turned on to allow water to be fully drained before freezing in the defrost liquid draining channels. After defrosting, the compressor may be inhibited from starting for 4 minutes to allow defrost liquid to drain away without freezing. Whenever a door opens, both fans are stopped until both doors are closed. To avoid stalling, both fans may be "kick started" by an initial short duration speed signal of 13 and 17 for the FC and PC respectively (for example for a duration of 1 second). In addition, if a door is open when a compartment's upper control limit temperature is exceeded, the compressor is not immediately energised but instead, a period of time (for example 90 seconds) is waited before energisation of the compressor so that energy is not unnecessarily wasted. A suitable alarm could be raised if the door remains open.

Accordingly, at least in the preferred form, the present invention provides a refrigerator/freezer and method of operation which reduces energy consumption by ensuring that the various compartments of the refrigerator/freezer reach their respective required temperatures at substantially the same time.

We claim:

1. A cooling device comprising:
   refrigeration plant means including condenser means, evaporator means and energisable compressor means,
   compartments to be maintained at selected temperatures, a first of said compartments to be maintained at a first selected temperature and a second of said compartments to be maintained at a second selected temperature, each of said compartments having an inlet and an outlet,
   an evaporator air flow passageway means which houses and is thereby cooled by said evaporator means,
   air flow regulating means for each said one compartment, a first air flow regulating means provided to regulate air flow in said first compartment and a second air flow regulating means to regulate air flow in said second compartment, said air flow regulating means regulating the amount of cooling supplied to each of said compartments,
   air flow supply passageways connecting the respective inlets of each of said compartments to said evaporator air flow passageway to allow air flow to said compartments,
   air flow return passageways connecting the respective outlets of each of said compartments to said evaporator air flow passageway to allow air to flow from said compartments,
   temperature sensing means in each of said compartments,
   control means which receives input from each said temperature sensing means and outputs control signals to each said air flow regulating means to regulate the air flow generated by each said air flow regulating means in accordance with programmed instructions so that the temperature in each of said compartments reach a temperature range about their respective selected temperatures at substantially the same time.

2. A cooling device as claimed in claim 1 wherein each said air flow regulating means comprise a variable speed fan means and said control means causes each said variable speed fan means to stop rotating upon said compartments both substantially reaching their respective selected temperatures.

3. A cooling device as claimed in claim 1 or claim 2 wherein said control means also controls the energisation of said compressor means such that when the temperatures in said compartments both substantially reach their respective selected temperatures said energisable compressor is de-energised.

4. A cooling device as claimed in claim 1 or claim 2 wherein said control means on occasion determines, for each said compartment, a difference temperature value between the temperature sensed by said temperature sensing means and the selected temperature for that compartment.

5. A cooling device as claimed in claim 1 or claim 2 wherein said control means causes the variable speed fan means in the compartment having the largest difference temperature value to rotate at a first speed and the variable speed fan means in the other of said compartments to rotate at a speed lower than said first speed.

6. A cooling device as claimed in claim 5 wherein said first speed is predetermined and the speed of the variable speed fan means in the other of said compartments is determined by subtracting a correction value from said first speed to arrive at the required speed value for the variable speed fan means in that other compartment.

7. A cooling device as claimed in claim 6 wherein, said correction value comprises a first component influenced by the difference between the difference temperature value for that other compartment and the difference temperature value in the compartment having the largest temperature difference and a second component influenced by the ratio of the difference between the difference temperature value in that other compartment and the difference temperature value in tie compartment having the largest temperature difference value to the difference temperature value in that compartment.

8. A cooling device as claimed in claim 1 or claim 2 wherein said control means causes a first variable speed fan means to rotate at a fixed speed and causes the variable speed fan means in the other compartment to rotate at a determined variable speed.

9. A cooling device as claimed in claim 8 wherein within a cooling cycle said determined variable speed is equal to the average fan speed from the previous cooling cycle adjusted by an offset amount influenced by the present temperature of that other compartment and the present temperature in the compartment housing said first variable speed fan means.

10. A cooling device as claimed in claim 9 wherein said selected temperature is a lower cut out temperature and said offset amount is equal to a constant multiplied by the difference between the difference temperature value for that other compartment and the difference temperature value for the compartment housing said first variable speed fan means.

11. A cooling device as claimed in claim 8 wherein said control means ensures that the required fan speed for each said variable speed fan means in said other compartment does not fall below a predetermined minimum value.

12. A cooling device as claimed in claim 8 wherein said control means records information relating to the operation of said refrigeration plant and the speed of said first variable speed fan means is set in dependence on said recorded information.

13. A cooling device as claimed in claim 12 wherein said information recorded by said control means includes the energisation of said energisable compressor means wherein the duty cycle of said energisable compressor means is recorded and occasionally updated.

14. A method of operating a cooling device having
refrigeration plant means including condenser means, evaporator means and energisable compressor means,
two compartments to be maintained at selected temperatures, a first of said compartments to be maintained at a first selected temperature and a second of said compartments to be maintained at a second selected temperature, each of said compartments having an inlet and an outlet,
an evaporator air flow passageway means which houses anal is thereby cooled by said evaporator means,
air flow regulating means for each said compartment, a first air flow regulating means provided to regulate air flow in said first compartment and a second air flow regulating means to regulate air flow in said second compartment, said air flow regulating means regulating the amount of cooling supplied to each of said compartments,
air flow supply passageways connecting the respective inlets of each of said compartments to said evaporator air flow passageway to allow air to flow to compartments,
air flow return passageways connecting the respective outlets of each of said compartments to said evaporator air flow passageway to allow air flow from said at least two compartments,
temperature sensing means in each of said compartments, and
control means which receives input from each said temperature sensing means and outputs control signals to each said air flow regulating means to regulate the air flow generated by each said air flow regulating means in accordance with programmed instructions so that the temperature in each of said compartments reach their respective selected temperatures at substantially the same time, said programmed instructions comprising the steps of:
i) sensing the temperatures in each of said compartments,
ii) calculating, for each said at least two compartments, a difference temperature value between the sensed temperature in that compartment and that compartment's selected temperature,
iii) determining the amount of regulation required by each staid air flow regulating means in order that each of said compartments will substantially reach their selected temperatures at the same time,
iv) operating each said air flow regulating means at the determined amount of regulation,
v) repeating steps (i) to (v) until each compartment has reached its selected temperature, and
vi) de-energising said energisable compressor means and reducing the amount of regulation of each said air flow regulating means to zero.

15. A method of operating a cooling device as claimed in claim 14 wherein said air flow regulating means comprise variable speed fan means and said step of determining the amount of regulation comprises causing the variable speed fan means in the compartment having the largest difference temperature value to rotate at a first speed and the variable speed fan means in the other compartment to rotate at a speed lower than said first speed.

16. A method of operating a cooling device as claimed in claim 15 wherein said first speed is predetermined and the speed of the variable speed fan means in the other compartment is determined by subtracting a correction value from said first speed to arrive at the required speed value for the variable speed fan means in that other compartment.

17. A method of operating a cooling device as claimed in claim 16 wherein said correction value comprises a first component influenced by the difference between the difference temperature value for that compartment and the difference temperature value in the compartment having the largest temperature difference and a second component influenced by the ratio of the difference between the difference temperature value in that other compartment and the difference temperature value in the compartment having the largest temperature difference value to the difference temperature value in that other compartment.

18. A method of operating a cooling device as claimed in claim 14 wherein said air flow regulating means comprise variable speed fan means and said step of determining the amount of regulation comprises said control means causing a first variable speed fan means to rotate at a fixed speed and causing the variable speed fan means in the other compartment to rotate at a determined variable speed.

19. A method of operating a cooling device as claimed in claim 18 wherein within a cooling cycle said determined variable speed is equal to the average fan speed from the previous cooling cycle adjusted by an offset amount influenced by the present temperature of that other compartment and the present temperature in the compartment housing said first variable speed fan means.

20. A method of operating a cooling device as claimed in claim 19 wherein said selected temperature is a lower cut out temperature and said offset amount is equal to a constant multiplied by the difference between the difference temperature value for that other compartment and the difference temperature value for the compartment housing said first variable speed fan means.

21. A method of operating a cooling device as claimed in claim 18 wherein said step of operating each said air flow regulating means includes the steps of ensuing that the required fan speed for each said variable speed fan means in said other remaining compartment does not fall below a predetermined minimum value.

22. A method of operating a cooling device as claimed in claim 18 wherein said method also includes the step of recording information relating to the operation of said refrigeration plant and the speed of said first variable speed fan means is set in dependence on said recorded information.

23. A method of operating a cooling device as claimed in claim 22 wherein said information recorded by said control means includes the energisation of said energisable compressor means wherein the duty cycle of said energisable compressor means is recorded and occasionally updated.

* * * * *

UNITED STATES PATENT AND TRADEMARK OFFICE
CERTIFICATE OF CORRECTION

PATENT NO. : 6,000,232

DATED : December 14, 1999

INVENTOR(S) : Daniel Witten-Hannah; David Andrew Thomas and Nicholas David Hayes.

It is certified that error appears in the above-identified patent and that said Letters Patent is hereby corrected as shown below:

Column 3, Line 18 "contructed accordance" should be -- constructed in accordance --

Column 3, Line 45 "width" should be -- with --

Column 4, Line 4 "S" should be -- 5 --

Column 4, Line 26 "firer" should be -- further --

Column 5, Line 34 "far" should be -- for --

Column 8, Line 32 "Time=$t_d$ should be -- Time= $t_a$

Column 8, Line 39 "Time $\rightarrow t_b$" should be -- Time = $t_b$ --

Column 9, Line 26 "fin" should be -- fan --

Column 9, Line 27 "fin" should be -- fan --

Column 10, Lines 4-5 "comnpartrnent" should be -- compartment --

Column 11, Lines 2-3 "temperatwue" should be -- temperature --

UNITED STATES PATENT AND TRADEMARK OFFICE
CERTIFICATE OF CORRECTION

PATENT NO. : 6,000,232
DATED : December 14, 1999
INVENTOR(S) : Daniel Witten-Hannah; David Andrew Thomas and Nicholas Nicholas David Hayes.

It is certified that error appears in the above-identified patent and that said Letters Patent is hereby corrected as shown below:

Column 12, Line 21 "at substantially" should be -- at --

Column 12, Line 58 "tie" should be -- the --

Column 13, Line 36 "anal" should be -- and --

Column 14, Line 4 "staid" should be -- said --

Column 14, Line 62 "ensuing" should be -- ensuring --

Signed and Sealed this

Ninth Day of January, 2001

Attest:

Attesting Officer

Q. TODD DICKINSON
Commissioner of Patents and Trademarks